(12) United States Patent
Murayama et al.

(10) Patent No.: US 11,984,071 B2
(45) Date of Patent: May 14, 2024

(54) LIGHT EMITTING APPARATUS, CONTROL METHOD OF THE SAME, DISPLAY APPARATUS, PHOTOELECTRIC CONVERSION APPARATUS, AND ELECTRONIC EQUIPMENT

(71) Applicant: CANON KABUSHIKI KAISHA, Tokyo (JP)

(72) Inventors: Kohei Murayama, Kanagawa (JP); Shinya Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 17/828,158

(22) Filed: May 31, 2022

(65) Prior Publication Data
US 2022/0383808 A1    Dec. 1, 2022

(30) Foreign Application Priority Data
Jun. 1, 2021   (JP) .................................. 2021-092512

(51) Int. Cl.
*G09G 3/3225*    (2016.01)
*H04N 23/63*    (2023.01)

(52) U.S. Cl.
CPC ........... *G09G 3/3225* (2013.01); *H04N 23/63* (2023.01); *G09G 2320/041* (2013.01); *G09G 2320/0673* (2013.01)

(58) Field of Classification Search
CPC .............................. G09G 3/3225; H04N 23/63
USPC ..................................................... 348/333.01
See application file for complete search history.

(56) References Cited

U.S. PATENT DOCUMENTS

| | | |
|---|---|---|
| 6,067,645 A | 5/2000 | Yamamoto et al. |
| 6,078,318 A | 6/2000 | Mori et al. |
| 6,188,378 B1 | 2/2001 | Yamamoto et al. |
| 6,335,720 B1 | 1/2002 | Mori et al. |
| 6,348,910 B1 | 2/2002 | Yamamoto et al. |
| 9,236,030 B2 | 1/2016 | Kitazawa et al. |
| 2014/0232708 A1 | 8/2014 | Kitazawa et al. |
| 2022/0223120 A1 | 7/2022 | Tsuboi et al. |

FOREIGN PATENT DOCUMENTS

| | | | |
|---|---|---|---|
| JP | WO02/21084 | * | 9/2000 |
| JP | 2014-157221 A | | 8/2014 |
| JP | 2016-099582 A | | 5/2016 |

* cited by examiner

*Primary Examiner* — Joel W Fosselman
(74) *Attorney, Agent, or Firm* — Venable LLP

(57) ABSTRACT

A light emitting apparatus includes a light emitting element, a temperature measurement device, a driving control unit, a calculation unit configured to calculate a correction value of a driving control parameter based on a measured temperature; and a change unit configured to change a coefficient of a function based on the measured temperature. The calculation unit calculates the correction value with respect to the measured temperature based on a function obtained by expressing a first function, which expresses a relationship between the measured temperature and the correction value, by a combined function of a plurality of third functions each generated by changing a coefficient of a second function, and the change unit changes, based on the measured temperature, the coefficient of the second function to generate the plurality of third functions.

25 Claims, 12 Drawing Sheets

GAMMA CORRECTION REGISTER VALUE

DAC CORRECTION REGISTER VALUE

CHROMATICITY CORRECTION REGISTER VALUE

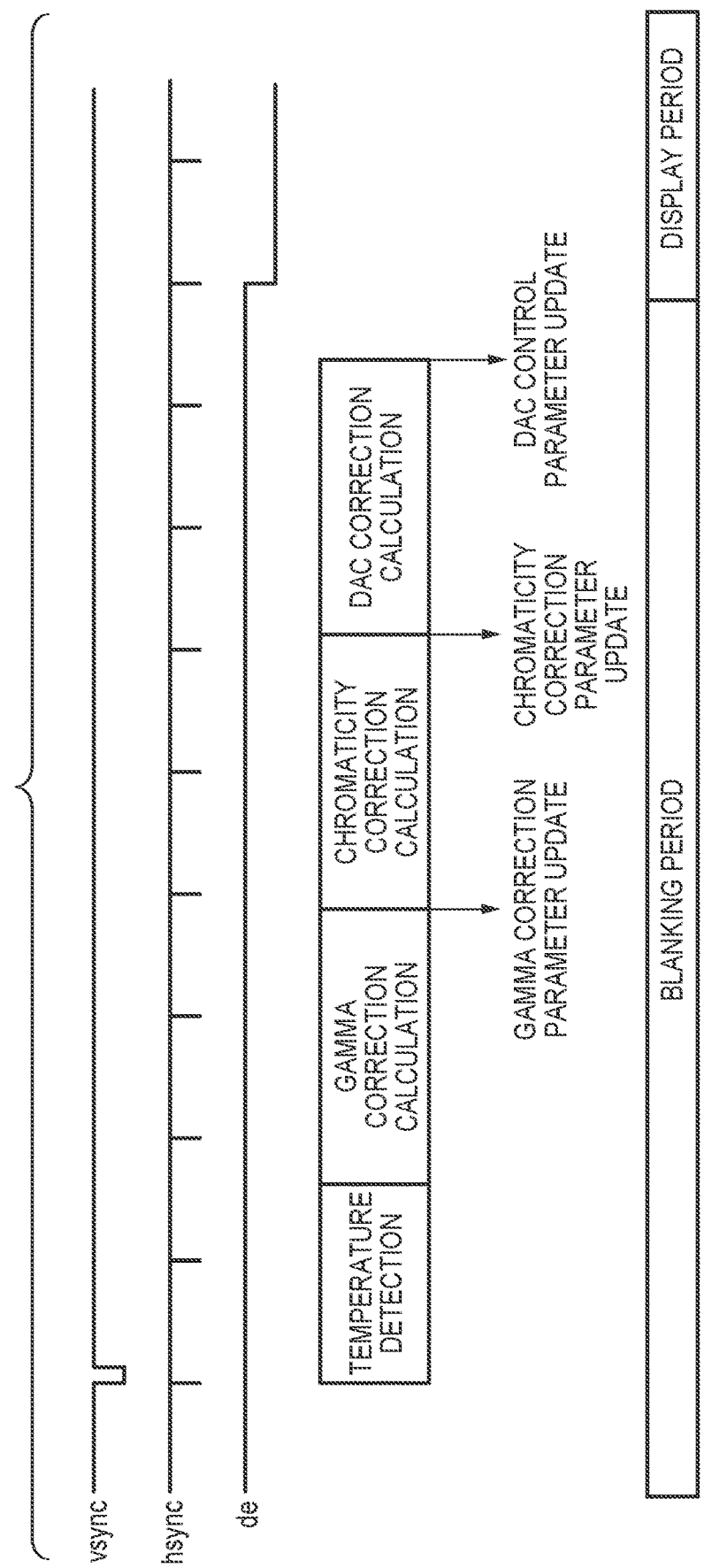

LIGHT EMITTING APPARATUS, CONTROL METHOD OF THE SAME, DISPLAY APPARATUS, PHOTOELECTRIC CONVERSION APPARATUS, AND ELECTRONIC EQUIPMENT

BACKGROUND OF THE INVENTION

Field of the Invention

The present invention relates to a technique for correcting a temperature fluctuation of the light emitting characteristic of a light emitting apparatus.

Description of the Related Art

In recent years, various display apparatuses have been developed in the field of displays, and weight reduction, thinning, and miniaturization thereof are being promoted. In particular, a display apparatus using an organic light emitting diode (OLED), which is a self-luminous element, is regarded as promising.

In general, the OLED has a light emitting characteristic that, even if the driving current amount is constant, the light emitting amount changes as the ambient temperature changes. For example, when the temperature becomes higher than usual, the resistance value decreases, so that the current value increases and the luminance may become higher than the desired luminance. To the contrary, when the temperature becomes lower than usual, the resistance value increases, so that the current value decreases and the luminance may become lower than the desired luminance.

Therefore, a display apparatus using an OLED is generally equipped with a correction process function for controlling the characteristic of the light emitting element that fluctuates in accordance with the ambient temperature. This correction process is implemented by correcting a digital value by, for example, DAC control for controlling the pixel driving voltage to adjust the driving current which decides the light emission luminance, or gamma control or gain control for controlling a pixel value.

That is, by correcting the parameter of each control in accordance with the temperature, it is possible to correct the display characteristic in accordance with a temperature fluctuation.

Each of Japanese Patent Laid-Open No. 2016-99582 (hereinafter PTL 1) and Japanese Patent Laid-Open No. 2014-157221 (hereinafter PTL 2) discloses a technique that includes a correction table or a register corresponding to the environmental temperature and corrects the driving current amount or the light-emission driving period in accordance with the measured temperature at the time of display.

However, when preparing the correction table corresponding to the environmental temperature as in the technique described in each of PTL 1 and PTL 2, there is a problem that increasing the temperature resolution of the table increases the size of the table or the number of registers, resulting in an increase in circuit scale. On the other hand, if the temperature resolution of the table is decreased to suppress the circuit scale, the display characteristic cannot be sufficiently corrected.

There is also a method of approximating the correction value corresponding to the environmental temperature with a function. However, since the OLED has a plurality of display characteristics to be corrected, it is necessary to perform approximation with a higher-order function. Accordingly, the circuit scale and software processing load increase, and this increases the processing time or the power consumption.

SUMMARY OF THE INVENTION

The present invention has been made in consideration of the above-described problems and, when correcting a fluctuation of the characteristic of a display apparatus caused by a change of the temperature condition, an increase in circuit scale or processing load is suppressed.

According to a first aspect of the present invention, there is provided a light emitting apparatus comprising: a light emitting element; a temperature measurement device; and at least one processor or circuit configured to function as: a driving control unit configured to control driving of the light emitting element; a calculation unit configured to calculate a correction value of a driving control parameter of the driving control unit based on a measured temperature measured by the temperature measurement device; and a change unit configured to change a coefficient of a function based on the measured temperature, wherein the calculation unit is a calculation unit that calculates the correction value with respect to the measured temperature based on a function obtained by expressing a first function, which expresses a relationship between the measured temperature and the correction value, by a combined function of a plurality of third functions each generated by changing a coefficient of a second function of lower order than the first function, and the change unit is a change unit that changes, based on the measured temperature, the coefficient of the second function to generate the plurality of third functions.

According to a second aspect of the present invention, there is provided a light emitting apparatus comprising: a light emitting element; a temperature measurement device; and at least one processor or circuit configured to function as: a driving control unit configured to control driving of the light emitting element; and a calculation unit configured to calculate a correction value of a driving control parameter of the driving control unit based on a measured temperature measured by the temperature measurement device, wherein the calculation unit calculates the correction value with respect to the measured temperature based on a function obtained by combining a plurality of quadratic functions.

According to a third aspect of the present invention, there is provided a display apparatus comprising a light emitting apparatus described above.

According to a fourth aspect of the present invention, there is provided a photoelectric conversion apparatus comprising: an optical device including a plurality of lenses; an image sensor configured to receive light having passed through the optical device; and a display device configured to display an image captured by the image sensor, wherein the display device includes a light emitting apparatus described above.

According to a fifth aspect of the present invention, there is provided an electronic equipment comprising: a display device including a light emitting apparatus described above; a housing provided with the display device; and a communication circuit provided in the housing and configured to perform external communication.

According to a sixth aspect of the present invention, there is provided a method of controlling a light emitting apparatus that comprises a light emitting element, a driving control unit configured to control driving of the light emitting element, and a temperature measurement device, the method comprising: calculating a correction value of a driving control parameter of the driving control unit based on a measured temperature measured by the temperature measurement device, in which the correction value with respect to the measured temperature is calculated by expressing a first function, which expresses a relationship between the measured temperature and the correction value, by a combination of a plurality of third functions each generated by changing a coefficient of a second function of lower order than the first function; and changing, based on the measured temperature, the coefficient of the second function to generate the plurality of third functions.

Further features of the present invention will become apparent from the following description of exemplary embodiments with reference to the attached drawings.

BRIEF DESCRIPTION OF THE DRAWINGS

FIG. 4 is a timing chart of temperature correction control according to the first embodiment;

DESCRIPTION OF THE EMBODIMENTS

Figure 1:
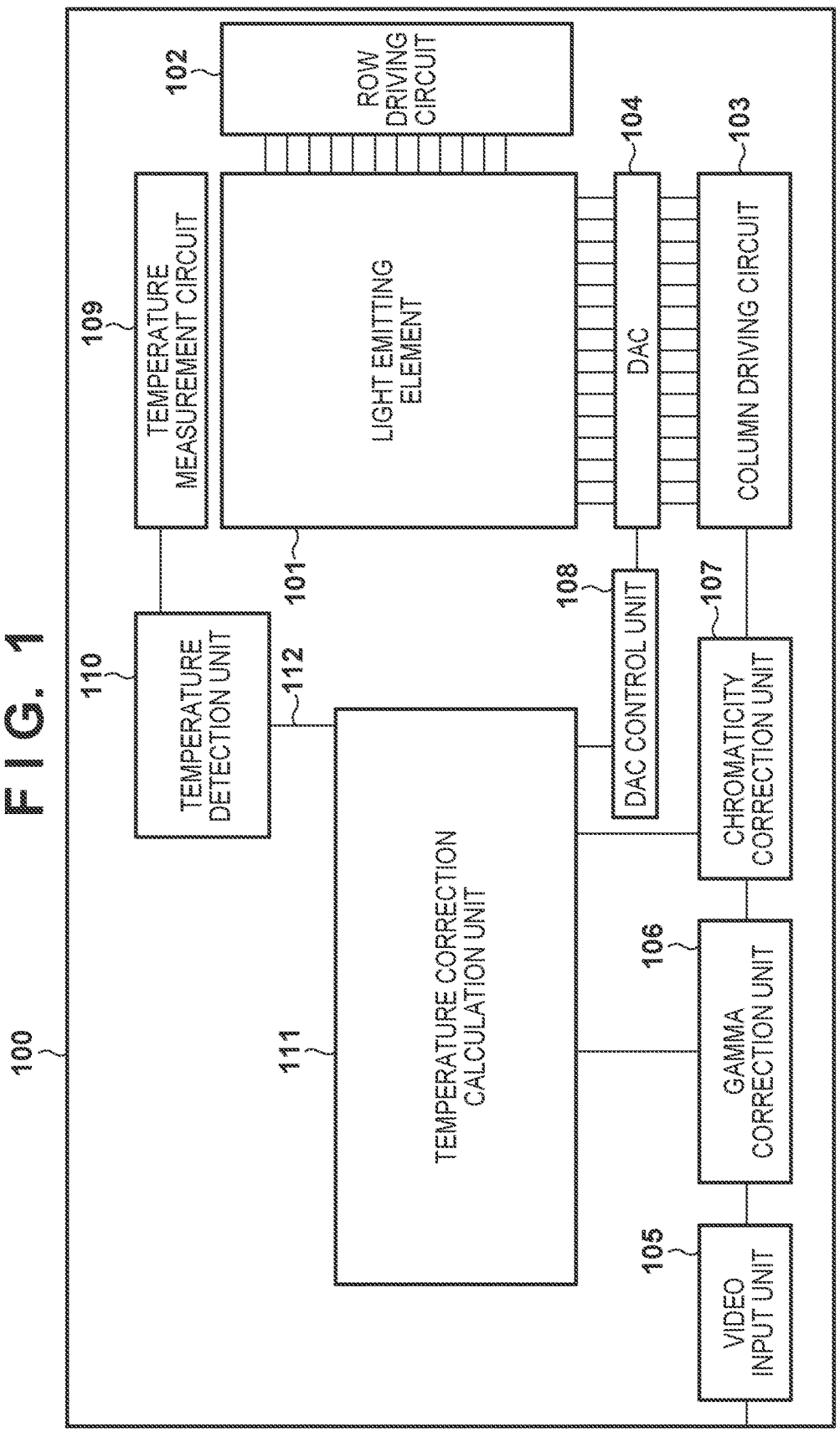
FIG. 1 is a block diagram showing the arrangement of a light emitting apparatus according to the first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing the arrangement of a light emitting apparatus according to the first embodiment of the present invention.

In FIG. 1, a light emitting apparatus 100 mounted on one semiconductor substrate includes a light emitting element 101 represented by an OLED, and is driven to emit light by a row driving circuit 102 and a column driving circuit 103. The column driving circuit 103 outputs a digital value signal used to drive pixels of each column, and a DA converter (to be referred to as DAC hereinafter) 104 converts this signal into an analog signal and supplies it to the light emitting element 101. The pixel data to be displayed on the light emitting element 101 is input as a digital value from a video input unit 105 to the light emitting apparatus 100.

The light emitting apparatus 100 includes, as a display driving control circuit, a gamma correction unit 106, a chromaticity correction unit 107, and a DAC control unit 108. The gamma correction unit 106 performs gamma correction on the input pixel data so as to obtain a desired gamma curve (driving control parameter) for each of color components R, G, and B. A correction parameter for each predetermined color component of the color components R, G, and B is input to the gamma correction unit 106, and a gamma-corrected digital value corresponding to the input digital value is generated in accordance with the correction parameter.

The color-mixing ratio (driving control parameter) of R, G, and B is corrected by the chromaticity correction unit 107. A correction parameter for each predetermined color component is input to the chromaticity correction unit 107, and a gain-corrected digital value corresponding to the input digital value is generated in accordance with the correction parameter.

The pixel data having undergone the gamma correction and the chromaticity correction is input to the column driving circuit 103. The light emitting apparatus 100 also includes the DAC control unit 108. Voltage value control parameters corresponding to the maximum digital value and the minimum digital value are input to the DAC control unit 108. By controlling the range of driving voltage, the display luminance is controlled.

The light emitting apparatus 100 also includes a temperature measurement circuit 109 for temperature measurement, which measures the environmental temperature upon driving the light emitting apparatus 100 and inputs the measured temperature to a temperature detection unit 110. The temperature detection unit 110 determines, as a temperature value, the data measured by the temperature measurement circuit 109. For example, by outputting, as temperature information 112, the temperature value obtained by averaging the results of a plurality of temperature measurements, it is also possible to perform control while absorbing a temperature fluctuation in a short time and a measurement error. The temperature information 112 detected by the temperature detection unit 110 is input to a temperature correction calculation unit 111. In the temperature correction calculation unit 111, a temperature correction parameter for the correction parameter of each of the gamma correction unit 106 and the chromaticity correction unit 107 and a temperature correction parameter for the voltage value control parameter of the DAC control unit 108 are generated based on the detected temperature information.

Figure 2:
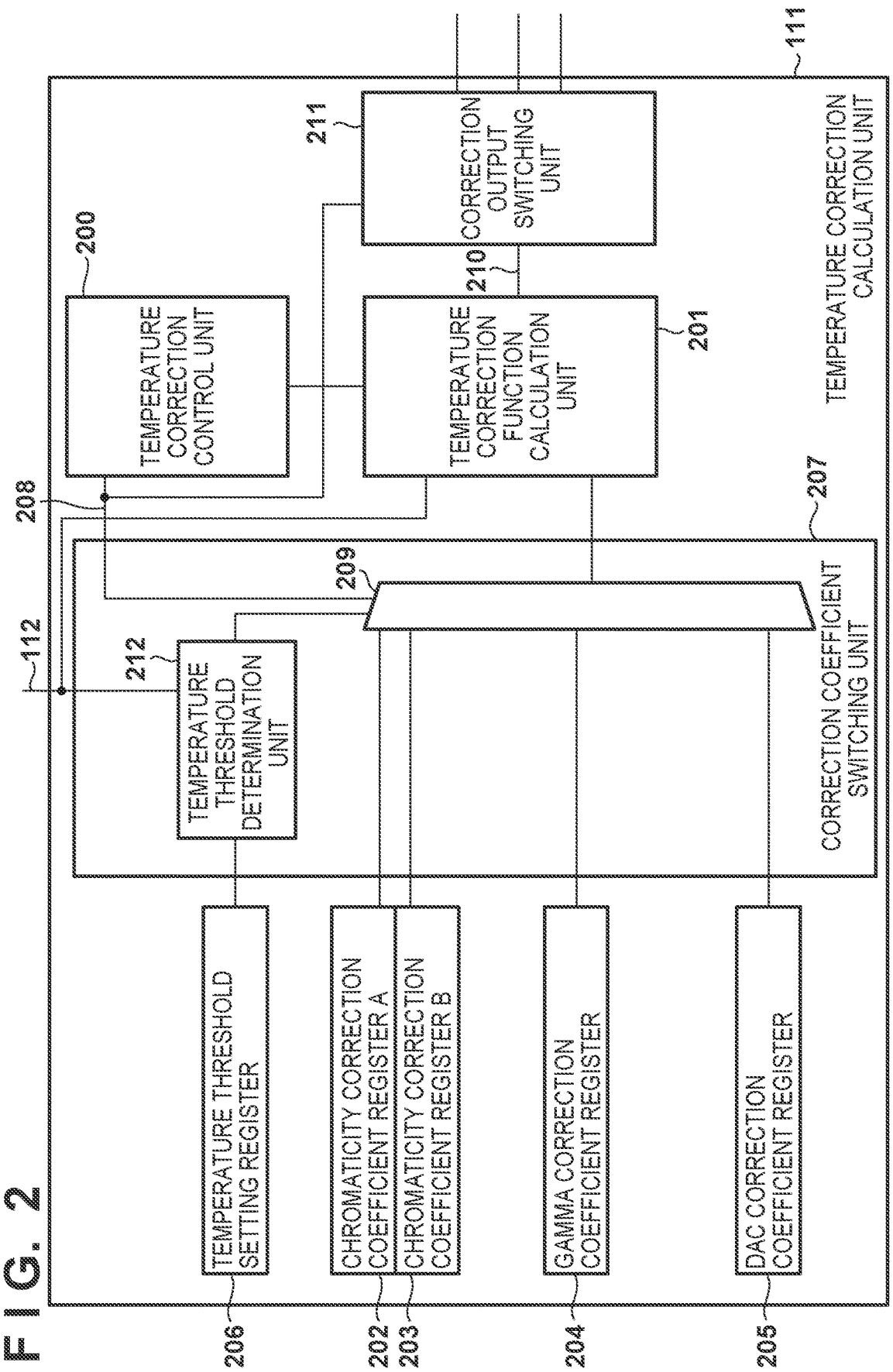
FIG. 2 is a block diagram showing the arrangement of a temperature correction calculation unit according to the first embodiment.

FIG. 2 is a block diagram showing the arrangement of the temperature correction calculation unit 111. A temperature correction control unit 200 controls the sequence of the entire temperature correction calculation, and controls the calculation timings of the gamma correction parameter, the chromaticity correction parameter, and the DAC correction parameter while using a predetermined timing as a trigger. At the timing designated by the temperature correction control unit 200, a temperature correction function calculation unit 201 calculates the temperature correction parameter for each of the gamma, the chromaticity, and the DAC while using the temperature information 112 as a variable. In this embodiment, the calculation is performed using a quadratic function of "$ax^2+bx$" with the temperature information 112 as a variable x.

Here, as coefficients a and b of the function, coefficients designated by coefficient registers 202 to 205 and selected by a correction coefficient switching unit 207 are used. Each of the coefficient registers 202 to 205 is a register of correction coefficients for one of the gamma, the chromaticity, and the DAC. In this embodiment, one gamma correction coefficient register 204 and one DAC correction coefficient register 205 are provided.

On the other hand, a plurality of registers for chromaticity correction can be arranged. Two chromaticity correction coefficient registers 202 and 203 are provided. An output of each of the correction coefficient registers 202 to 205 is input, as a calculation coefficient, to the temperature correction function calculation unit 201 via a selection circuit 209 of the correction coefficient switching unit 207.

A temperature threshold setting register 206 is a register for holding threshold information designating the boundary of the temperature range with respect to the temperature data. In this embodiment, one temperature data is held as the threshold information and input to the correction coefficient switching unit 207.

In addition to the output from each of the registers 202 to 206, the temperature information 112 and calculation target function information 208, which is output from the temperature correction control unit 200, are input to the correction coefficient switching unit 207. The calculation target function information 208 is information indicating which one of the gamma correction, the chromaticity correction, and the DAC control is the correction calculation target with respect to the temperature fluctuation. In accordance with the designation of the calculation target function information 208, the correction coefficient switching unit 207 selects, from the registers 202 to 205, the coefficient to be input to the temperature correction function calculation unit 201 and outputs the selected coefficient. That is, the correction coefficient switching unit 207 is controlled so as to select the gamma correction coefficient register 204 if the calculation target function information 208 indicates the gamma correction, and select the DAC correction coefficient register 205 if the calculation target function information 208 indicates the DAC control.

If the calculation target function information 208 indicates the chromaticity correction, the correction coefficient is selected based on the determination result of a temperature threshold determination unit 212. The temperature threshold determination unit 212 refers to the setting value of the temperature threshold setting register 206 and the information of the temperature information 112, and instructs the selection circuit 209 to select one of the coefficient registers 202 and 203. The selection circuit 209 is controlled so as to select the chromaticity correction coefficient register A 202 if the temperature information 112 is equal to or larger than the value of the temperature threshold setting register 206, and select the chromaticity correction coefficient register B 203 if the temperature information 112 is smaller than the value of the temperature threshold setting register 206. That is, the selection circuit 209 is controlled to switch the coefficient to be input to the temperature correction function calculation unit 201 in accordance with the detected temperature.

Correction result information 210 of the temperature correction function calculation unit 201 is input to the correction output switching unit 211. In accordance with the calculation target function information 208 indicated by the temperature correction control unit 200, the correction output switching unit 211 controls to switch the output destination of the correction result information 210 to one of the gamma correction unit 106, the chromaticity correction unit 107, and the DAC control unit 108. Each of the gamma correction unit 106, the chromaticity correction unit 107, and the DAC control unit 108 adjusts the correction parameter in accordance with the temperature fluctuation by adding/subtracting the correction result information 210 to/from the correction parameter adjusted for a certain temperature.

Figure 3A:
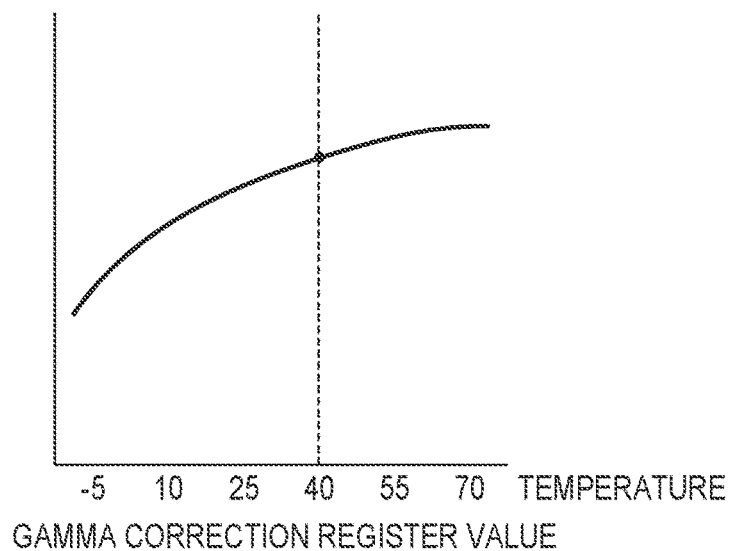
FIGS. 3A to 3C are graphs each illustrating the temperature fluctuation characteristic in the first embodiment.
Figure 3B:
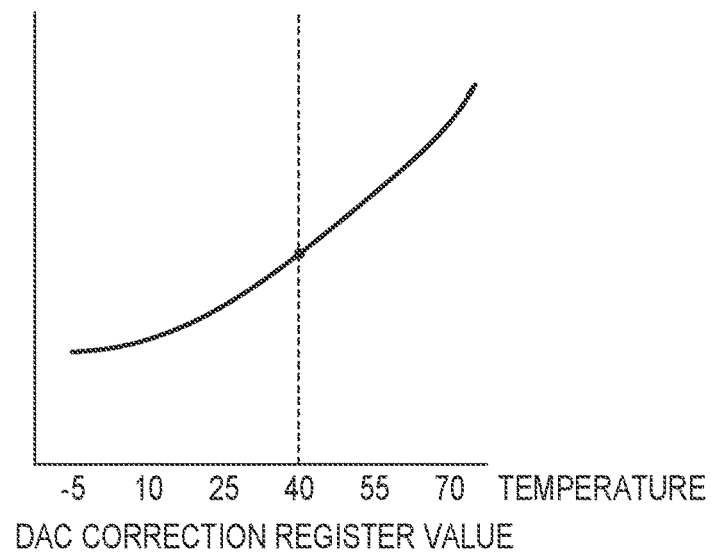
Figure 3C:
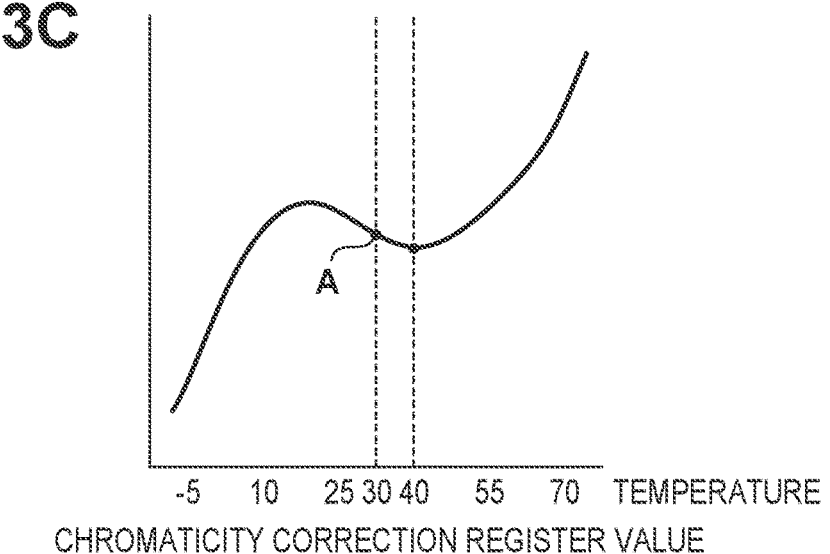

The action of the temperature correction according to this embodiment will be described below. Each of FIGS. 3A to 3C illustrates the fluctuation of the correction parameter value with respect to the temperature fluctuation in one of the gamma correction unit 106, the chromaticity correction unit 107, and the DAC control unit 108. Here, each correction parameter is individually adjusted with 40 C° as the reference temperature.

FIG. 3A shows the temperature fluctuation of the temperature correction parameter (correction value) (the relationship between the temperature and the temperature correction parameter value) for gamma correction, and FIG. 3B shows the temperature fluctuation of the temperature correction parameter (correction value) for DAC control correction. Each of them shows the characteristic that can be approximated by a quadratic function system. FIG. 3C shows the temperature fluctuation of the temperature correction parameter for chromaticity correction. This correction parameter is, for example, the correction parameter for B with respect to G while using G as a reference. The temperature correction parameter for chromaticity correction has the characteristic that has two extrema and cannot be approximated by a quadratic function system.

FIG. 4 is a timing chart regarding the temperature correction according to this embodiment. In this embodiment, a temperature correction process is started based on a display vertical synchronization timing VSYNC. If VSYNC is detected, the temperature detection unit 110 samples temperature data of the temperature measurement circuit 109, and inputs the temperature information 112 to the temperature correction calculation unit 111.

The temperature correction control unit 200 starts control of the temperature correction calculation at the input timing of the temperature information 112. In this embodiment, it is controlled such that the temperature correction calculation is sequentially performed in the order of the gamma correction calculation, the chromaticity correction calculation, and the DAC correction calculation.

When starting the gamma correction calculation, the temperature correction control unit 200 outputs, as the calculation target function information 208, a signal indicating the gamma correction, and notifies it to the correction coefficient switching unit 207. Since the calculation target function information 208 indicates the gamma correction, the correction coefficient switching unit 207 selects the gamma correction coefficient register 204 as the function calculation coefficient, and outputs the coefficient to the temperature correction function calculation unit 201. Based on the output timing of the gamma correction coefficient from the correction coefficient switching unit 207, the temperature correction control unit 200 instructs the temperature correction function calculation unit 201 to start calculation of the correction parameter of the gamma correction. The temperature correction function calculation unit 201 performs function calculation while using the input coefficient and the temperature information 112 as the variable, and outputs the correction result information 210 to the correction output switching unit 211. Based on the designation of the calculation target function information 208, the correction output switching unit 211 outputs the correction result information 210 to the gamma correction unit 106. Upon completion of output of the correction result information 210 from the correction output switching unit 211 to the gamma correction unit 106, the calculation target function information 208 is switched to the chromaticity correction to perform chromaticity correction calculation as the next step.

When the calculation target is the chromaticity correction, one of the chromaticity correction coefficient registers 202 and 203 is selected based on the temperature information 112 and the temperature threshold setting register 206. Here, normally, the temperature correction parameter (correction value) for chromaticity correction has two extrema and cannot be approximated by a quadratic function system as shown in FIG. 3C, so that a cubic or higher-order function is required. However, using a cubic or higher-order function increases the calculation load and the calculation time. To prevent this, in this embodiment, the function having two extrema is not expressed by a cubic or higher-order function but reproduced by connecting two quadratic functions (combining a plurality of quadratic functions). The two quadratic functions can be obtained by changing the coefficient (switching the outputs of the chromaticity correction coefficient registers 202 and 203). More specifically, in this embodiment, the function as shown in FIG. 3C is expressed by connecting two quadratic functions as a change point A set at a temperature of 30° C. (threshold temperature). That is, the correction coefficient switching unit 207 is controlled so as to select the coefficient of the chromaticity correction coefficient register A 202 if the temperature value indicated by the temperature information 112 is equal to or higher than 30° C., and select the coefficient of the chromaticity correction coefficient register B 203 if the temperature value is lower than 30° C. Then, the correction coefficient is output to the temperature correction function calculation unit 201. That is, the coefficient is selected based on the magnitude relationship between the temperature information 112 and the threshold temperature.

The coefficient held in the chromaticity correction coefficient register A 202 and the coefficient held in the chromaticity correction coefficient register B 203 are defined such that the temperature correction calculation results obtained by two quadratic functions connected to each other are the same value at 30° C. serving as the switching temperature. Further, it is desirable to define such that, under the temperature condition near 30° C., the temperature correction calculation result obtained by selecting one of the coefficients is close to that obtained by selecting the other. By matching the temperature correction calculation results at the switching temperature, it is possible to suppress occurrence of an unnatural change of display when the temperature crosses the switching temperature threshold.

Based on the output timing of the chromaticity correction coefficient from the correction coefficient switching unit 207, the temperature correction control unit 200 instructs the temperature correction function calculation unit 201 to start calculation of the correction parameter of the chromaticity correction. The temperature correction function calculation unit 201 performs function calculation while using the input coefficient and the temperature information 112 as the variable, and outputs the correction result information 210 to the correction output switching unit 211. Based on the designation of the calculation target function information 208, the correction output switching unit 211 outputs the correction result information 210 to the chromaticity correction unit 107. Upon completion of output of the correction result information 210 from the correction output switching unit 211 to the chromaticity correction unit 107, the calculation target function information 208 is switched to the DAC correction to perform DAC correction calculation as the next step.

As to the DAC correction, the process similar to that for the correction parameter of the gamma correction described above is performed except that the output of the DAC correction coefficient register 205 is selected as the coefficient without using the temperature threshold as in the gamma correction. When the output of the correction parameter from the correction output switching unit 211 to the DAC control unit 108 is completed, the temperature correction control unit 200 completes the temperature correction calculation process, and waits for the display vertical synchronization timing VSYNC for the next frame, which serves as the next trigger.

According to the sequence described above, it is possible to correct the luminance characteristics by the gamma, the chromaticity, and the DAC control in accordance with the detected temperature. Further, by switching the correction coefficient of the quadratic function in accordance with the temperature, the single common temperature correction function calculation unit 201 can correct, using the quadratic function calculation, the characteristic which requires correction using a cubic function as shown in FIG. 3C.

Second Embodiment

Figure 5:
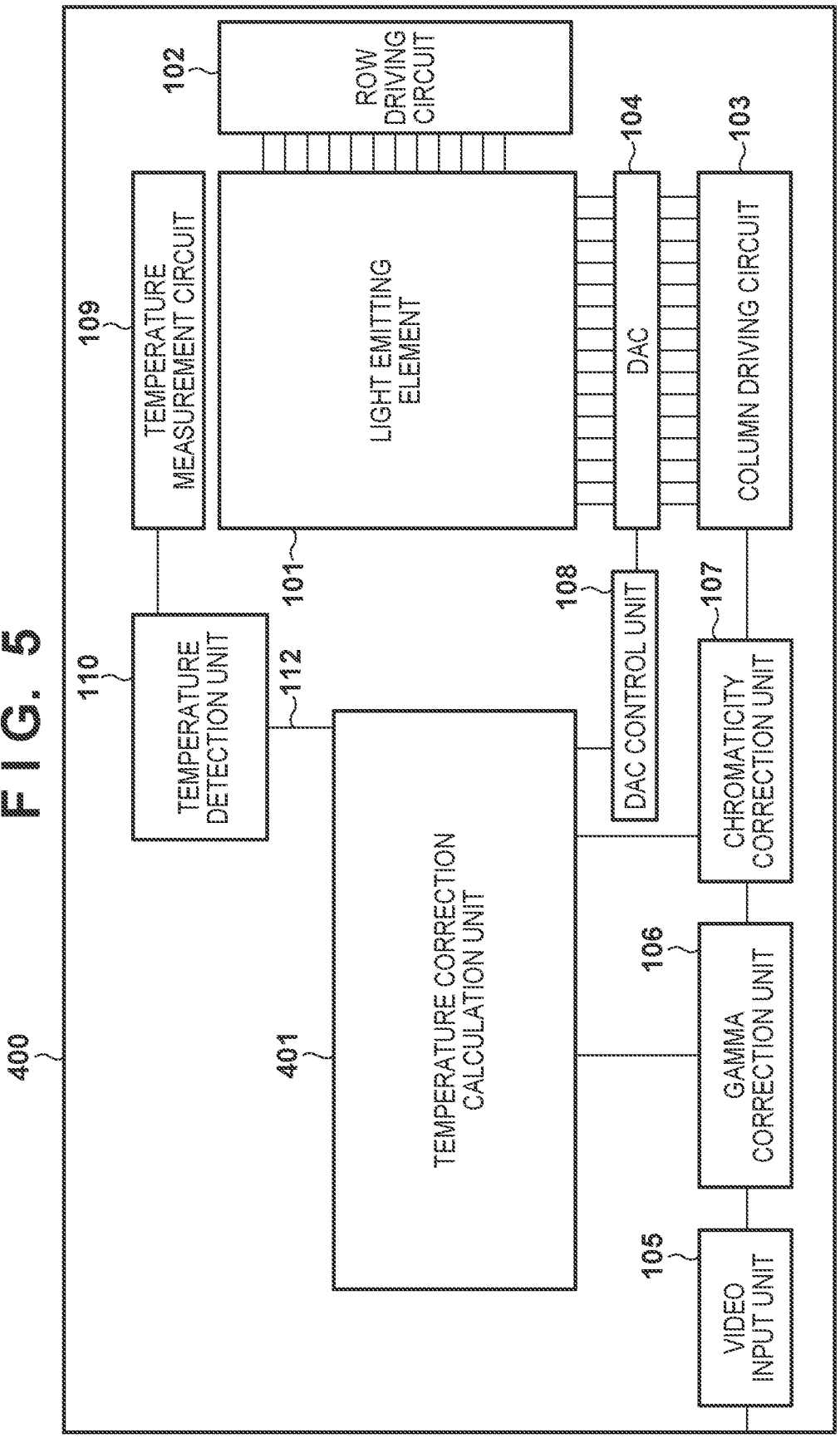
FIG. 5 is a block diagram showing the arrangement of a light emitting apparatus according to the second embodiment.

In the first embodiment, the arrangement has been illustrated in which the temperature threshold is set only for the chromaticity correction and the coefficient can be switched in accordance with the temperature information 112. However, an arrangement is also possible in which the temperature threshold is set for the gamma correction and the DAC correction as well and the coefficient are switched for each temperature. Further, it is also possible to independently switch the coefficient in each of the gamma correction and the chromaticity correction for each of the color components R, G, and B. It is further possible to provide (set) the temperature threshold for each of the color components R, G, and B. FIG. 5 is a view showing the arrangement of a light emitting apparatus 400 that supports the control as described above. The arrangement and action of the light emitting apparatus 400 according to this embodiment are similar to those of the light emitting apparatus illustrated in the first embodiment except the arrangement and action of a temperature correction calculation unit 401.

Figure 6:
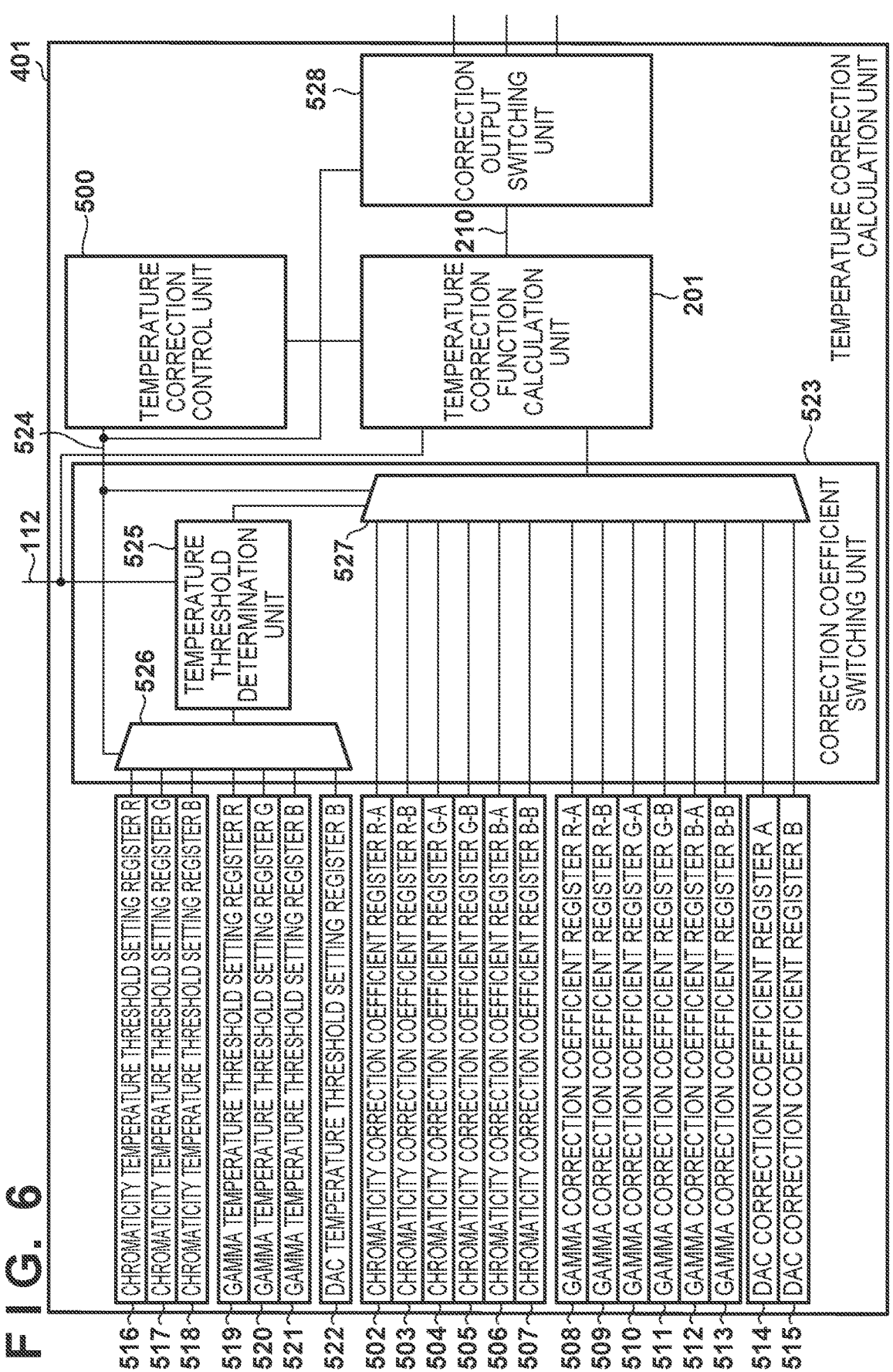
FIG. 6 is a block diagram showing the arrangement of a temperature correction calculation unit according to the second embodiment.

FIG. 6 is a block diagram showing the arrangement of the temperature correction calculation unit 401 according to this embodiment. A temperature correction control unit 500 controls the sequence of the entire temperature correction calculation, and controls the calculation timings of the gamma correction parameter, the chromaticity correction parameter, and the DAC correction parameter while using a predetermined timing as a trigger. Since the temperature correction control unit 500 in this embodiment is different from the temperature correction control unit 200 in the first embodiment in that it is configured to calculate the correction parameters of the gamma correction and the chromaticity correction for each of the color components R, G, and B, the control sequence is different from that in the first embodiment. The arrangement of a temperature correction function calculation unit 201 is similar to that in the first embodiment. That is, at the timing designated by the temperature correction control unit 500, the temperature correction function calculation unit 201 performs function calculation of the temperature correction parameter for each of the gamma, the chromaticity, and the DAC while using temperature information 112 as a variable. In this embodiment, the calculation is performed using a quadratic function of "$ax^2+bx$" with the temperature information 112 as a variable x. Here, as coefficients a and b of the function, coefficients designated by coefficient registers 502 to 515 and selected by a correction coefficient switching unit 523 are used.

Each of the coefficient registers 502 to 515 is a register of correction coefficients for one of the gamma, the chromaticity, and the DAC. For the gamma and the chromaticity, a plurality of coefficients different for each of the color components R, G, and B can be held and designated. In this embodiment, two correction coefficient registers are provided for each of the color components R, G, and B for each of the gamma and the chromaticity, and two correction coefficient registers are provided for the DAC. The output of each of the correction coefficient registers 502 to 515 is input as the calculation coefficient of the temperature correction function calculation unit 201 via a correction coefficient switching unit 523.

Each of temperature threshold setting registers 516 to 522 is a register for designating the boundary of the temperature range with respect to the temperature data. In this embodiment, the register is provided for each of the color components R, G, and B for each of the gamma and the chromaticity. The register for the DAC control is also provided. In this embodiment, each register holds one temperature data as threshold information, and the threshold information is input to the correction coefficient switching unit 523. In addition to the input from each of the registers 502 to 522, the temperature information 112 and calculation target function information 524, which is output from the temperature correction control unit 500, are input to the correction coefficient switching unit 523.

The calculation target function information 524 is information indicating which one of the gamma correction, the chromaticity correction, and the DAC control is the correction calculation target with respect to the temperature fluctuation and, for the gamma correction and the chromaticity correction, indicating which one of the color components R, G, and B is the correction calculation target. In accordance with the designation of the calculation target function information 524, the correction coefficient switching unit 523 selects, in a selection circuit 526, the temperature threshold setting serving as the target from the registers 516 to 522. In a temperature threshold determination unit 525, the selected temperature threshold setting is compared with the input temperature information 112 to determine whether the temperature data is equal to or larger than the threshold or smaller than the threshold. A selection circuit 527 is designated to select the correction coefficient register A (to be described later) if the temperature data is equal to or larger than the threshold, and select the correction coefficient register B (to be described later) if the temperature data is smaller than the threshold.

Figure 7:
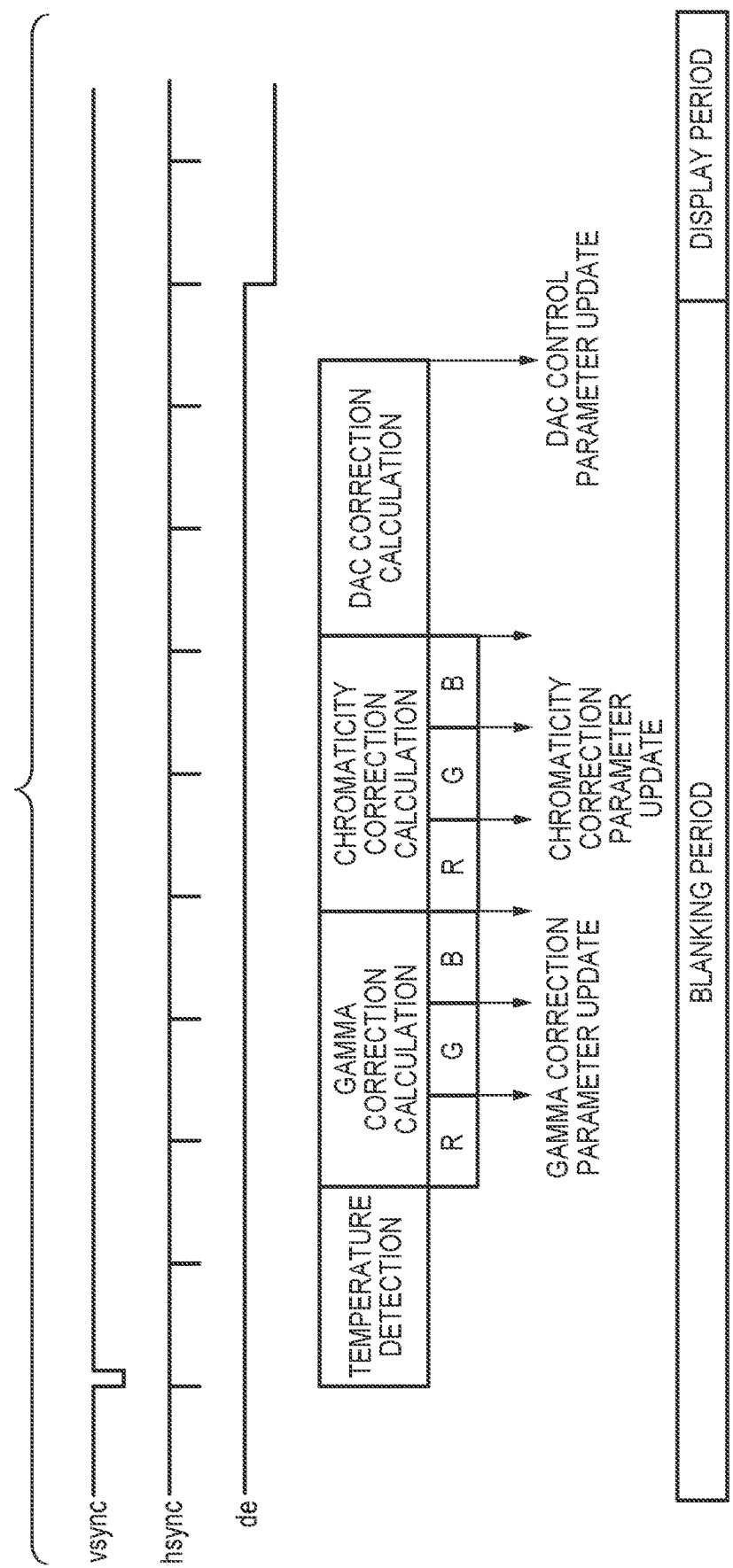
FIG. 7 is a timing chart of temperature correction control according to the second embodiment.

In the selection circuit 527, based on the designation of the correction coefficient register A or B and the calculation target function information 524, the coefficient of the calculation target is selected from the correction coefficient registers 502 to 515 and output to the temperature correction function calculation unit 201. The temperature correction function calculation unit 201 outputs correction result information 210 to a correction output switching unit 528. In accordance with the calculation target function information 524 indicated by the temperature correction control unit 500, the correction output switching unit 528 controls to switch the output destination of the correction result information 210. Each of a gamma correction unit 106, a chromaticity correction unit 107, and a DAC control unit 108 adjusts the correction parameter in accordance with the temperature fluctuation by adding/subtracting the correction result information 210 to/from the correction parameter adjusted for a certain temperature. FIG. 7 shows a timing chart regarding the temperature correction according to this embodiment.

In this embodiment, a temperature correction process is started based on a display vertical synchronization timing VSYNC. If VSYNC is detected, a temperature detection unit 110 samples temperature data of a temperature measurement circuit 109, and inputs the temperature information 112 to the temperature correction calculation unit 401. The temperature correction control unit 500 starts control of the temperature correction calculation at the input timing of the temperature information 112. In this embodiment, the temperature correction calculation is sequentially performed in the order of the gamma correction calculation, the chromaticity correction calculation, and the DAC correction calculation. In each of the gamma correction calculation and the chromaticity correction calculation, it is controlled such that the calculation is sequentially performed in the order of the color components R, G, and B. The process sequence is similar to that in the first embodiment except that the calculation process is performed for each color component and each calculation target function has the temperature threshold, so that a detailed description thereof will be omitted.

According to the arrangement of this embodiment, it is possible to independently set the temperature threshold for each color component in the gamma correction, for each color component in the chromaticity correction, and for the DAC control, and it is also possible to switch the coefficient of the function calculation therein. Therefore, the single common temperature correction function calculation unit 201 can calculate the correction parameter with respect to the temperature characteristic which changes for each correction function and each color component.

In each of the first and second embodiments, the arrangement has been illustrated in which one temperature threshold setting is held. However, a plurality of temperature threshold settings may be held. In a case in which a plurality of temperature threshold settings are held, a plurality of correction coefficient registers are correspondingly provided. With this, it becomes possible to control the temperature correction function calculation while switching the coefficient for each of the three or more temperature ranges. As a result, it is possible to correct, using a quadratic function of lower order, the fluctuation of the characteristic expressed by a quartic or higher-order function with respect to the temperature fluctuation.

In each of the first and second embodiments, the arrangement has been described in which temperature correction is performed by hardware formed on a single semiconductor substrate, but the correction may be performed by software. That is, a plurality of temperature threshold settings and correction coefficients are stored on the memory of the software, and the correction coefficient is switched with reference to the temperature detection result. Then, temperature correction calculation may be performed by the software to control the parameters of the gamma correction, the chromaticity correction, and the DAC control. The hardware may be formed on a plurality of semiconductor substrates.

Next, the light emitting function portion of a light emitting apparatus according to an embodiment of the present invention will be described.

[Pixel Circuit]

The light emitting apparatus can include a pixel circuit connected to the light emitting element. The pixel circuit may be an active matrix circuit that individually controls light emission of the first and second light emitting elements. The active matrix circuit may be a voltage or current programing circuit. A driving circuit includes a pixel circuit for each pixel. The pixel circuit can include a light emitting element, a transistor for controlling light emission luminance of the light emitting element, a transistor for controlling a light emission timing, a capacitor for holding the gate voltage of the transistor for controlling the light emission luminance, and a transistor for connection to GND without intervention of the light emitting element.

The light emitting apparatus includes a display region and a peripheral region arranged around the display region. The light emitting apparatus includes the pixel circuit in the display region and a display control circuit in the peripheral region. The mobility of the transistor forming the pixel circuit may be smaller than that of a transistor forming the display control circuit.

The slope of the current-voltage characteristic of the transistor forming the pixel circuit may be smaller than that of the current-voltage characteristic of the transistor forming the display control circuit. The slope of the current-voltage characteristic can be measured by a so-called Vg-Ig characteristic.

The transistor forming the pixel circuit is a transistor connected to the light emitting element such as the first light emitting element.

[Pixel]

An organic light emitting apparatus includes a plurality of pixels. Each pixel includes sub-pixels that emit light components of different colors. The sub-pixels include, for example, R, G, and B emission colors, respectively.

In each pixel, a region also called a pixel opening emits light. This region is the same as the first region.

The pixel opening can have a size of 5 μm (inclusive) to 15 μm (inclusive). More specifically, the pixel opening can have a size of 11 μm, 9.5 μm, 7.4 μm, 6.4 μm, or the like.

A distance between the sub-pixels can be 10 μm or less, and can be, more specifically, 8 μm, 7.4 μm, or 6.4 μm.

The pixels can have a known arrangement form in a plan view. For example, the pixels may have a stripe arrangement, a delta arrangement, a pentile arrangement, or a Bayer arrangement. The shape of each sub-pixel in a plan view may be any known shape. For example, a quadrangle such as a rectangle or a rhombus, a hexagon, or the like may be possible. A shape which is not a correct shape but is close to a rectangle is included in a rectangle. The shape of the sub-pixel and the pixel arrangement can be used in combination.

[Application of Organic Light Emitting Element of Embodiment of Present Invention]

The organic light emitting element according to an embodiment of the present invention can be used as a constituent member of a display apparatus or an illumination apparatus. In addition, the organic light emitting element is applicable to the exposure light source of an electrophotographic image forming apparatus, the backlight of a liquid crystal display apparatus, a light emitting apparatus including a color filter in a white light source, and the like.

The display apparatus may be an image information processing apparatus that includes an image input unit for inputting image information from an area CCD, a linear CCD, a memory card, or the like, and an information processing unit for processing the input information, and displays the input image on a display unit.

In addition, a display unit included in an image capturing apparatus or an inkjet printer can have a touch panel function. The driving type of the touch panel function may be an infrared type, a capacitance type, a resistive film type, or an electromagnetic induction type, and is not particularly limited. The display apparatus may be used for the display unit of a multifunction printer.

The display apparatus according to the embodiment will be described next with reference to the accompanying drawings.

Figure 8:
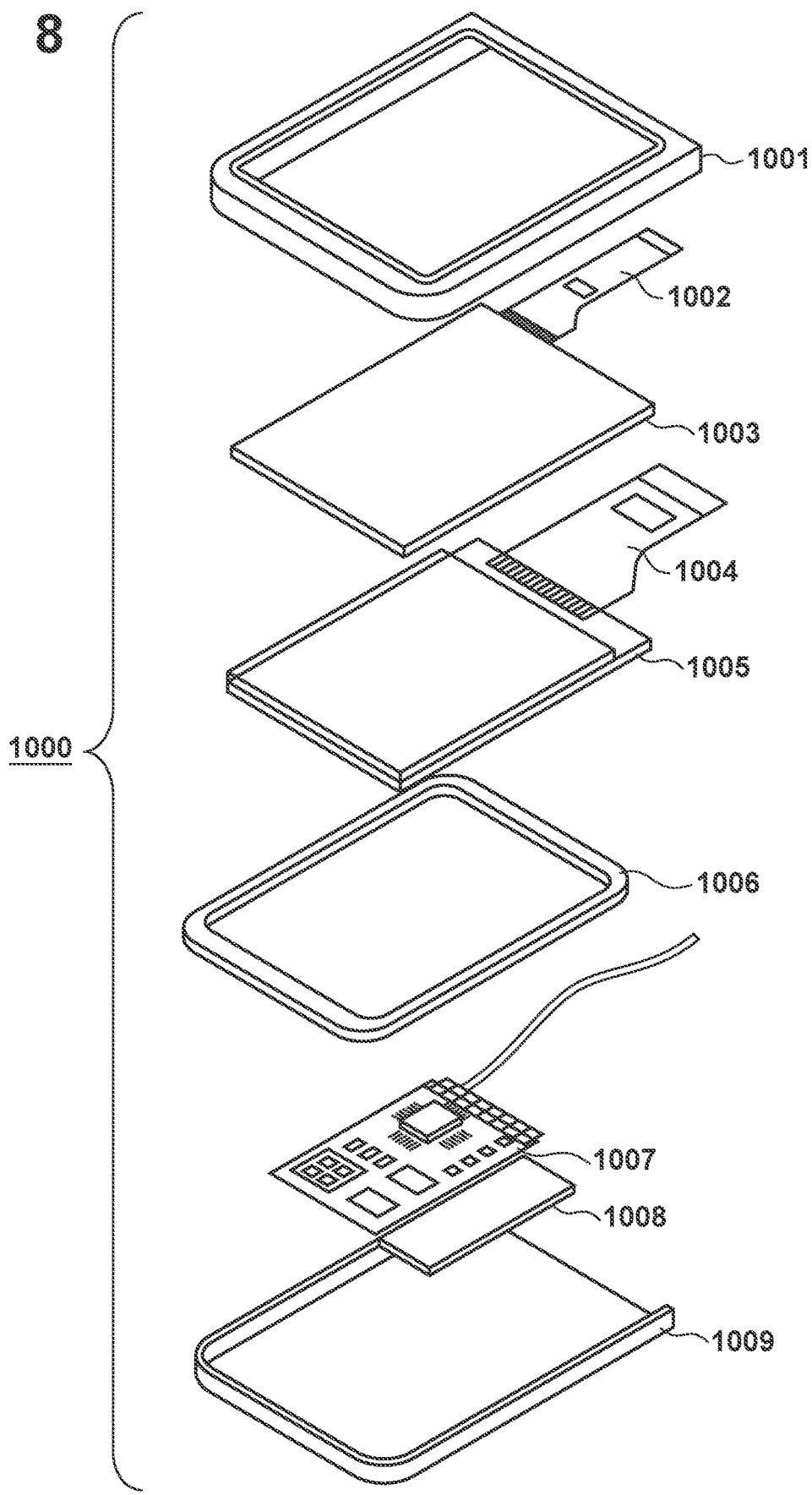
FIG. 8 is a schematic view showing an example of a display apparatus according to an embodiment of the present invention.

FIG. 8 is a schematic view showing an example of the display apparatus according to this embodiment. A display apparatus 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005 (the light emitting apparatus 100 or 400 in the above-described embodiments).

Transistors are printed on the circuit board 1007. The battery 1008 is unnecessary if the display apparatus is not a portable equipment. Even when the display apparatus is a portable equipment, the battery 1008 may be arranged at another position.

The display apparatus according to this embodiment can include color filters of red, green, and blue. The color filters of red, green, and blue can be arranged in a delta array.

The display apparatus according to this embodiment can also be used for a display unit of a portable terminal. At this time, the display unit can have both a display function and an operation function. Examples of the portable terminal are a portable phone such as a smartphone, a tablet, and a head mounted display.

The display apparatus according to this embodiment can be used for a display unit of an image capturing apparatus including an optical unit having a plurality of lenses, and an image sensor for receiving light having passed through the optical unit. The image capturing apparatus can include a display unit for displaying information acquired by the image sensor. In addition, the display unit can be either a display unit exposed outside the image capturing apparatus, or a display unit arranged in the finder. The image capturing apparatus can be a digital camera or a digital video camera.

Figure 9A:
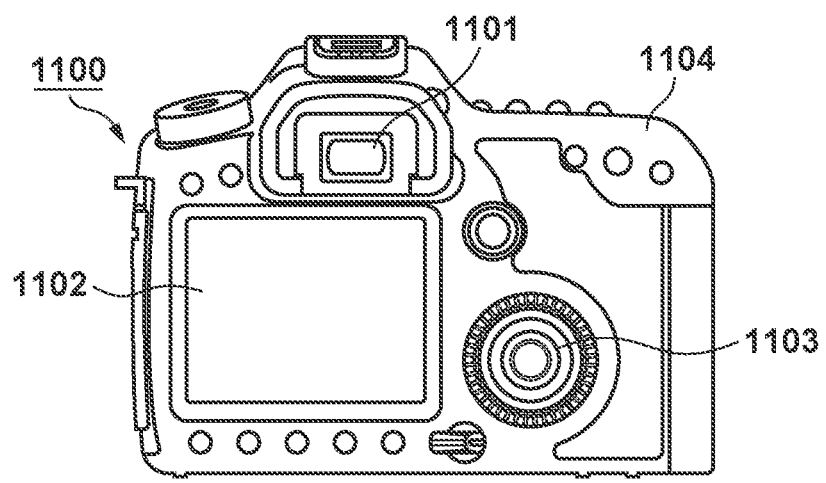
FIG. 9A is a view showing an image capturing apparatus according to an embodiment.

FIG. 9A is a schematic view showing an example of the image capturing apparatus according to this embodiment. An image capturing apparatus 1100 can include a viewfinder 1101, a rear display 1102, an operation unit 1103, and a housing 1104. The viewfinder 1101 can include the display apparatus according to this embodiment. In this case, the display apparatus can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time, so the information is preferably displayed as soon as possible. Therefore, the display apparatus using the organic light emitting element of the present invention is preferably used. This is so because the organic light emitting element has a high response speed. The display apparatus using the organic light emitting element can be used for the apparatuses that require a high display speed more preferably than for the liquid crystal display apparatus.

The image capturing apparatus 1100 includes an optical unit (not shown). This optical unit has a plurality of lenses, and forms an image on an image sensor that is accommodated in the housing 1104. The focal points of the plurality of lenses can be adjusted by adjusting the relative positions. This operation can also automatically be performed. The image capturing apparatus may be called a photoelectric conversion apparatus. Instead of sequentially capturing an image, the photoelectric conversion apparatus can include, as an image capturing method, a method of detecting the difference from a previous image, a method of extracting an image from an always recorded image, or the like.

Figure 9B:
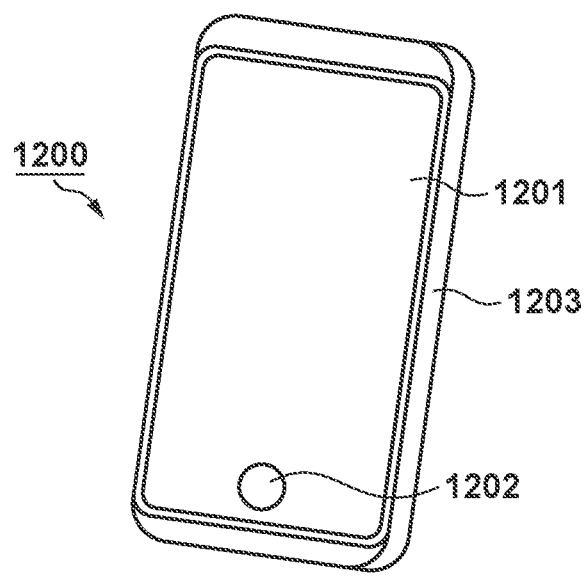
FIG. 9B is a view showing an electronic equipment according to the embodiment.

FIG. 9B is a schematic view showing an example of an electronic equipment according to this embodiment. An electronic equipment 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit can also be a biometric authentication unit that performs unlocking or the like by authenticating the fingerprint. The electronic equipment including the communication unit can also be regarded as a communication equipment. The electronic equipment can further have a camera function by including a lens and an image sensor. An image captured by the camera function is displayed on the display unit. Examples of the electronic equipment are a smartphone and a notebook computer.

Figure 10A:
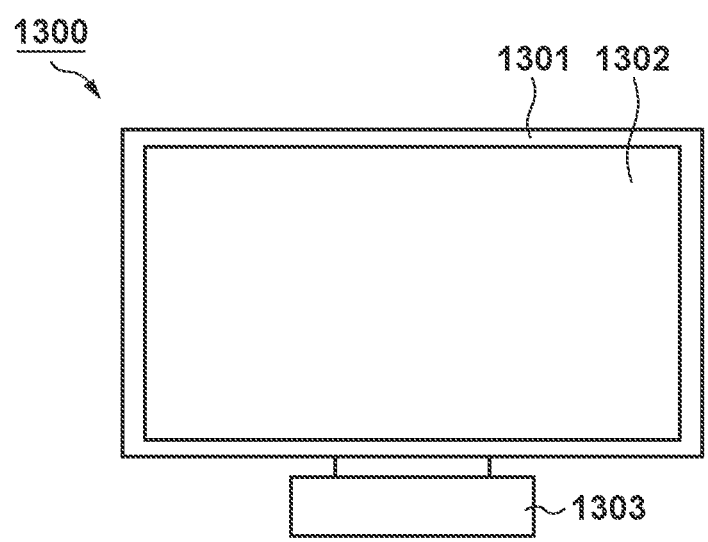
FIGS. 10A and 10B are views showing examples of the display apparatus according to the embodiment.
Figure 10B:
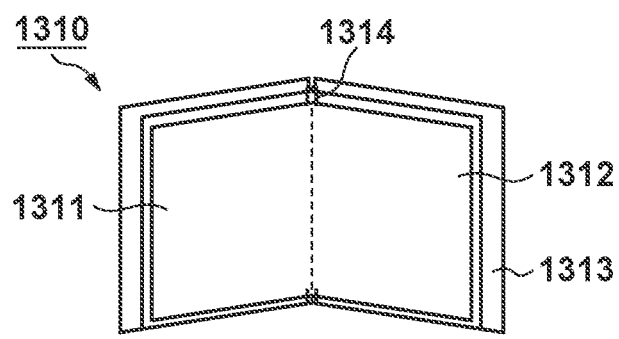

FIGS. 10A and 10B are schematic views showing examples of the display apparatus according to this embodiment. FIG. 10A shows a display apparatus such as a television monitor or a PC monitor. A display apparatus 1300 includes a display unit 1302 including a frame 1301. The light emitting apparatus according to this embodiment can be used for the display unit 1302.

The display apparatus 1300 includes a base 1303 that supports the frame 1301 and the display unit 1302. The base 1303 is not limited to the form shown in FIG. 10A. The lower side of the frame 1301 may also function as the base.

In addition, the frame 1301 and the display unit 1302 can be bent. The radius of curvature in this case can be 5,000 (inclusive) mm to 6,000 (inclusive) mm.

FIG. 10B is a schematic view showing another example of the display apparatus according to this embodiment. A display apparatus 1310 shown in FIG. 10B can be folded, that is, the display apparatus 1310 is a so-called foldable display apparatus. The display apparatus 1310 includes a first display unit 1311, a second display unit 1312, a housing 1313, and a bending point 1314. Each of the first display unit 1311 and the second display unit 1312 can include the light emitting apparatus according to this embodiment. The first display unit 1311 and the second display unit 1312 can also be one seamless display apparatus. The first display unit 1311 and the second display unit 1312 can be divided by the bending point. The first display unit 1311 and the second display unit 1312 can display different images, and can also display one image together.

Figure 11A:
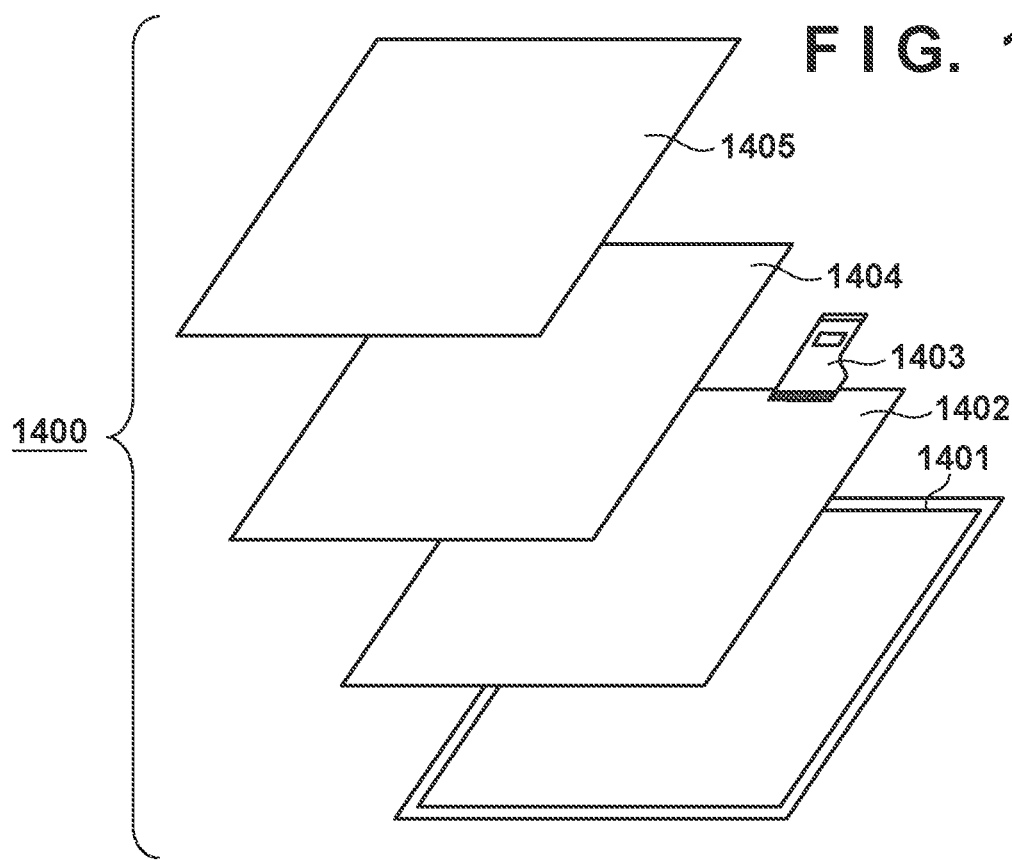
FIG. 11A is a view showing an illumination apparatus according to the embodiment.

FIG. 11A is a schematic view showing an example of the illumination apparatus according to this embodiment. An illumination apparatus 1400 can include a housing 1401, a light source 1402 (the light emitting apparatus 100 or 400 in the above-described embodiments), a circuit board 1403, an optical film 1404, and a light-diffusing unit 1405.

The light source can include the organic light emitting element according to this embodiment. The optical film can be a filter that improves the color rendering of the light source. When performing lighting-up or the like, the light-diffusing unit can throw the light of the light source over a broad range by effectively diffusing the light. The optical film and the light-diffusing unit can be provided on the illumination light emission side. The illumination apparatus can also include a cover on the outermost portion, as needed.

The illumination apparatus is, for example, an apparatus for illuminating the interior of the room. The illumination apparatus can emit white light, natural white light, or light of any color from blue to red. The illumination apparatus can also include a light control circuit for controlling these light components.

The illumination apparatus can also include the organic light emitting element according to the present invention and a power supply circuit connected to the organic light emitting element. The power supply circuit is a circuit for converting an AC voltage into a DC voltage. White has a color temperature of 4,200 K, and natural white has a color temperature of 5,000 K. The illumination apparatus may also include a color filter.

In addition, the illumination apparatus according to this embodiment can include a heat radiation unit. The heat radiation unit radiates the internal heat of the apparatus to the outside of the apparatus, and examples are a metal having a high specific heat and liquid silicon.

Figure 11B:
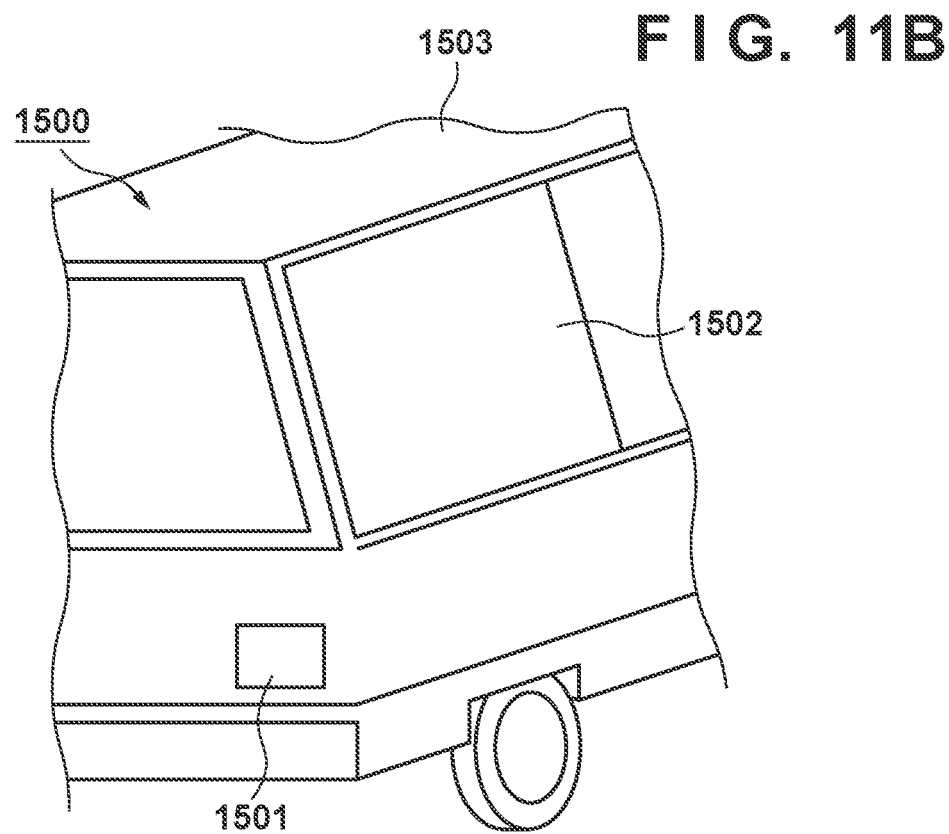
FIG. 11B is a view showing an automobile according to the embodiment.

FIG. 11B is a schematic view of an automobile as an example of a moving body according to this embodiment. The automobile includes a taillight as an example of the lighting appliance. An automobile 1500 includes a taillight 1501, and can have a form in which the taillight is turned on when performing a braking operation or the like.

The taillight 1501 can include the organic light emitting element according to this embodiment. The taillight can include a protection member for protecting the organic EL element. The material of the protection member is not limited as long as the material is a transparent material with a strength that is high to some extent, and is preferably polycarbonate. A furandicarboxylic acid derivative, an acrylonitrile derivative, or the like may be mixed in polycarbonate.

The automobile 1500 can include a vehicle body 1503, and a window 1502 attached to the vehicle body 1503. This window can be a window for checking the front and back of the automobile, and can also be a transparent display. This transparent display can include the organic light emitting element according to this embodiment. In this case, the constituent materials of the electrodes and the like of the organic light emitting element are preferably formed by transparent members.

The moving body according to this embodiment can be a ship, an airplane, a drone, or the like. The moving body can include a main body and a lighting appliance installed in the main body. The lighting appliance can emit light for making a notification of the position of the main body. The lighting appliance includes the organic light emitting element according to this embodiment.

Figure 12A:
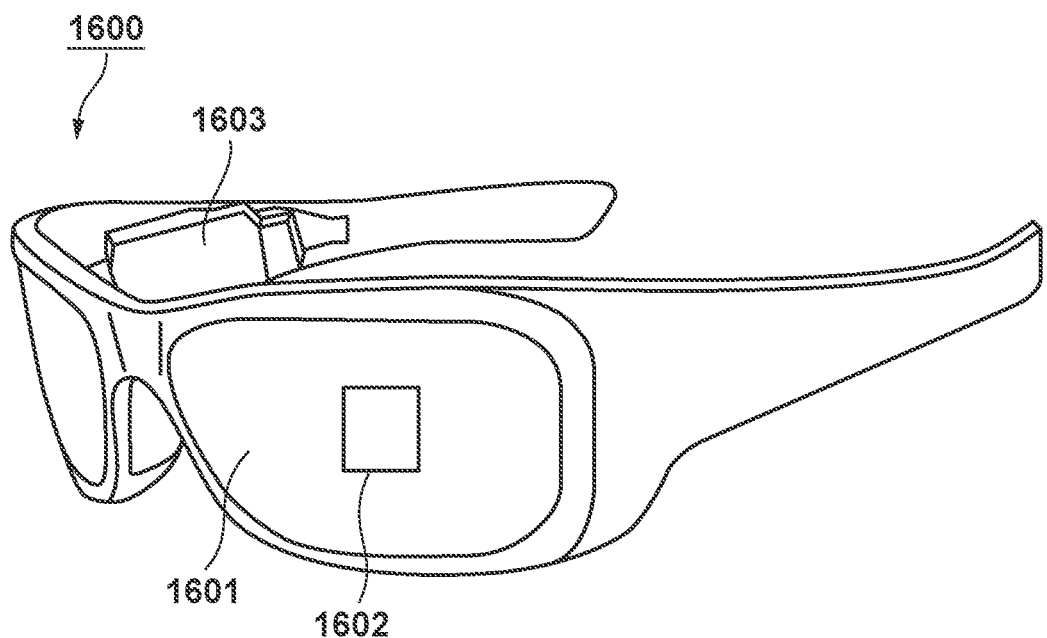
FIGS. 12A and 12B are views each showing an example of a glass-type display apparatus according to the embodiment.
Figure 12B:
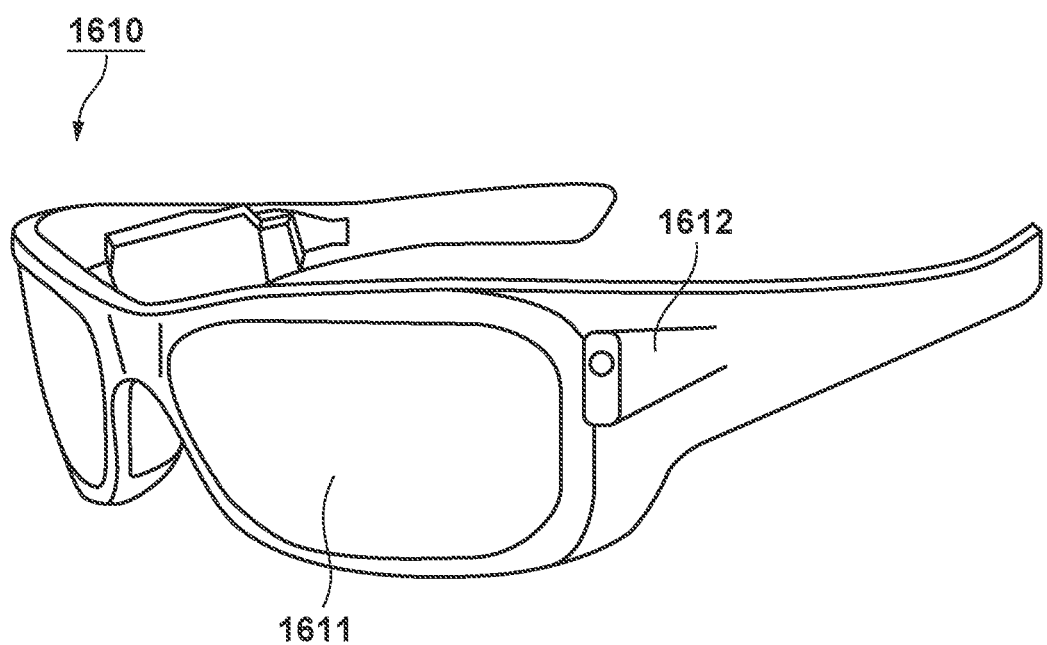

With reference to FIGS. 12A and 12B, application examples of the display apparatus according to each of the above-described embodiments will be described. The display apparatus can be applied to a system that can be worn as a wearable device such as smartglasses, an HMD, or a smart contact lens. An image capturing display apparatus used for such application examples can include an image capturing apparatus capable of photoelectrically converting visible light and a display apparatus capable of emitting visible light.

Glasses 1600 (smartglasses) according to one application example will be described with reference to FIG. 12A. An image capturing apparatus 1602 such as a CMOS sensor or an SPAD is provided on the surface side of a lens 1601 of the glasses 1600. In addition, the display apparatus of each of the above-described embodiments is provided on the back surface side of the lens 1601.

The glasses 1600 further includes a control apparatus 1603. The control apparatus 1603 functions as a power supply that supplies power to the image capturing apparatus 1602 and the display apparatus according to each embodiment. In addition, the control apparatus 1603 controls the operations of the image capturing apparatus 1602 and the display apparatus. An optical system configured to condense light to the image capturing apparatus 1602 is formed on the lens 1601.

Glasses 1610 (smartglasses) according to one application example will be described with reference to FIG. 12B. The glasses 1610 includes a control apparatus 1612, and an image capturing apparatus corresponding to the image capturing apparatus 1602 and a display apparatus are mounted on the control apparatus 1612. The image capturing apparatus in the control apparatus 1612 and an optical system configured to project light emitted from the display apparatus are formed in a lens 1611, and an image is projected to the lens 1611. The control apparatus 1612 functions as a power supply that supplies power to the image capturing apparatus and the display apparatus, and controls the operations of the image capturing apparatus and the display apparatus. The control apparatus may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The display apparatus according to the embodiment of the present invention can include an image capturing apparatus including a light receiving element, and a displayed image on the display apparatus can be controlled based on the line-of-sight information of the user from the image capturing apparatus.

More specifically, the display apparatus can decide a first visual field region at which the user is gazing and a second visual field region other than the first visual field region based on the line-of-sight information. The first visual field region and the second visual field region may be decided by the control apparatus of the display apparatus, or those decided by an external control apparatus may be received. In the display region of the display apparatus, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first display region and the second display region may be decided by the control apparatus of the display apparatus, or those decided by an external control apparatus may be received. The resolution of the region of higher priority may be controlled to be higher than the resolution of the region other than the region of higher priority. That is, the resolution of the region of relatively low priority may be low.

When performing display control based on line-of-sight detection, smartglasses further including an image capturing apparatus configured to capture the outside can preferably be applied. The smartglasses can display captured outside information in real time.

As has been described above, when an apparatus using the organic light emitting element according to this embodiment is used, stable display with high image quality can be performed even in long time display.

According to the present invention, when correcting a fluctuation of the characteristic of a display apparatus caused by a change of the temperature condition, it is possible to suppress an increase in circuit scale or processing load.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-092512, filed Jun. 1, 2021, which is hereby incorporated by reference herein in its entirety.

What is claimed is:

1. A light emitting apparatus comprising:
a light emitting element;
a temperature measurement device; and
at least one processor or circuit configured to function as:
a driving control unit configured to control driving of the light emitting element; and
a calculation unit configured to calculate a correction value of a driving control parameter of the driving control unit based on a measured temperature measured by the temperature measurement device; and
a change unit configured to change a coefficient of a function based on the measured temperature,
wherein the calculation unit is a calculation unit that calculates the correction value with respect to the measured temperature based on a function obtained by expressing a first function, which expresses a relationship between the measured temperature and the correction value, by a combined function of a plurality of third functions each generated by changing a coefficient of a second function of lower order than the first function, and
the change unit is a change unit that changes, based on the measured temperature, the coefficient of the second function to generate the plurality of third functions.

2. The apparatus according to claim 1, wherein the calculation unit calculates, using a single calculation unit, a plurality of correction values of a plurality of driving control parameters of the driving control unit.

3. The apparatus according to claim 1, wherein the change unit changes the coefficient of the second function based on a magnitude relationship between the measured temperature and a predetermined threshold temperature.

4. The apparatus according to claim 3, wherein the change unit can set the threshold temperature different for each of the driving control parameters.

5. The apparatus according to claim 3, wherein the change unit can set the threshold temperature different for each color component of the driving control parameter.

6. The apparatus according to claim 3, wherein the number of the settable threshold temperatures is different for each of the driving control parameters or each color component.

7. The apparatus according to claim 1, wherein the first function is a cubic or higher-order function.

8. The apparatus according to claim 7, wherein the second function is a quadratic function.

9. The apparatus according to claim 1, wherein the calculation unit sets the coefficient of the second function such that two third functions have the same value at a joint point where the two third functions are combined.

10. The apparatus according to claim 1, wherein the driving control parameter includes at least one of a parameter of chromaticity correction and a parameter of gamma correction.

11. A light emitting apparatus comprising:
a light emitting element;
a temperature measurement device; and
at least one processor or circuit configured to function as:
a driving control unit configured to control driving of the light emitting element; and
a calculation unit configured to calculate a correction value of a driving control parameter of the driving control unit based on a measured temperature measured by the temperature measurement device,
wherein the calculation unit calculates the correction value with respect to the measured temperature based on a function obtained by combining a plurality of quadratic functions.

12. The apparatus according to claim 11, further comprising
a change unit configured to change a coefficient of at least one of the plurality of quadratic functions based on the measured temperature.

13. The apparatus according to claim 11, wherein the calculation unit calculates, using a single calculation unit, a plurality of correction values of a plurality of driving control parameters of the driving control unit.

14. The apparatus according to claim 12, wherein the change unit changes the coefficient of the second function based on a magnitude relationship between the measured temperature and a predetermined threshold temperature.

15. The apparatus according to claim 14, wherein the change unit can set the threshold temperature different for each of the driving control parameters.

16. The apparatus according to claim 14, wherein the change unit can set the threshold temperature different for each color component of the driving control parameter.

17. The apparatus according to claim 14, wherein the number of the settable threshold temperatures is different for each of the driving control parameters or each color component.

18. The apparatus according to claim 11, wherein the calculation unit sets a coefficient of the quadratic functions such that two quadratic functions have the same value at a joint point where the two quadratic functions are combined.

19. The apparatus according to claim 11, wherein the driving control parameter includes at least one of a parameter of chromaticity correction and a parameter of gamma correction.

20. The apparatus according to claim 1, wherein the apparatus is mounted on a single semiconductor substrate.

21. The apparatus according to claim 1, wherein the apparatus comprises a plurality of pixels, and at least one of the plurality of pixels includes an organic light emitting element and a transistor connected to the organic light emitting element.

22. A display apparatus comprising a light emitting apparatus defined in claim 21.

23. A photoelectric conversion apparatus comprising:
an optical device including a plurality of lenses;
an image sensor configured to receive light having passed through the optical device; and
a display device configured to display an image captured by the image sensor,
wherein the display device includes a light emitting apparatus defined in claim 1.

24. An electronic equipment comprising:
- a display device including a light emitting apparatus defined in claim 1;
- a housing provided with the display device; and
- a communication circuit provided in the housing and configured to perform external communication.

25. A method of controlling a light emitting apparatus that comprises a light emitting element, a driving control unit configured to control driving of the light emitting element, and a temperature measurement device, the method comprising:
- calculating a correction value of a driving control parameter of the driving control unit based on a measured temperature measured by the temperature measurement device, in which the correction value with respect to the measured temperature is calculated by expressing a first function, which expresses a relationship between the measured temperature and the correction value, by a combination of a plurality of third functions each generated by changing a coefficient of a second function of lower order than the first function; and
- changing, based on the measured temperature, the coefficient of the second function to generate the plurality of third functions.

* * * * *